United States Patent
Sumitani

[19]

[11] Patent Number: 6,108,598
[45] Date of Patent: Aug. 22, 2000

[54] ONBOARD CONTROL SYSTEM FOR CONTROLLING DEVICES INSTALLED ON MOTOR VEHICLE AND METHOD OR REWRITING CONTROL PROGRAM AND VARIABLES THEREFOR

[75] Inventor: Jiro Sumitani, Tokyo, Japan

[73] Assignee: Mitsubishi Denki Kabusihiki Kaisha, Tokyo, Japan

[21] Appl. No.: 08/732,855

[22] Filed: Oct. 15, 1996

[30] Foreign Application Priority Data

Apr. 23, 1996 [JP] Japan ................................ 8-101330

[51] Int. Cl.$^7$ .................................................. G06F 9/24
[52] U.S. Cl. ........................... 701/29; 701/35; 701/102; 701/114; 123/479; 395/182.21
[58] Field of Search ............................. 701/29, 35, 102, 701/115, 114, 36; 123/479, 22.1; 395/652, 182.21, 183.22

[56] References Cited

U.S. PATENT DOCUMENTS

| | | | |
|---|---|---|---|
| 5,247,446 | 9/1993 | Motz et al. | 364/431.12 |
| 5,446,665 | 8/1995 | Adrian et al. | 364/431.04 |
| 5,523,948 | 6/1996 | Adrain | 364/431.01 |
| 5,526,267 | 6/1996 | Sogawa | 364/431.11 |
| 5,586,034 | 12/1996 | Takaba et al. | 364/431.04 |
| 5,771,474 | 6/1998 | Matt et al. | 701/29 |
| 5,802,485 | 9/1998 | Koelle et al. | 701/29 |

FOREIGN PATENT DOCUMENTS

| | | |
|---|---|---|
| 0117735 | 9/1984 | European Pat. Off. . |
| 07287603 | 10/1995 | Japan . |
| 07287604 | 10/1995 | Japan . |
| 07287606 | 10/1995 | Japan . |

Primary Examiner—Tan Nguyen
Assistant Examiner—Arthur D. Donnelly
Attorney, Agent, or Firm—Sughrue, Mion, Zinn, Macpeak & Seas, PLLC

[57] ABSTRACT

A vehicle-onboard control system for controlling various devices mounted on the motor vehicle. A control program for the control system can be altered through facilitated processing procedure with simple hardware structure while avoiding unfitness of control variables stored in a backup random access memory and used in executing the control program. A bootstrap program (13) responds to a command signal (C) issued by an external memory rewriting device (50) upon rewriting of the control program to thereby set an initialization flag (FN) in a backup RAM (14) containing control variables. The control program rewritten with updated data supplied from the memory rewriting device (50) responds to the set state of the initialization flag (FN) upon activation, to thereby initialize the control variables stored in the backup RAM (14) so that the control variables conform with the control program.

13 Claims, 11 Drawing Sheets

ORDINARY STATE
(REWRITE SIGNAL A IS IN OFF-STATE)

REWRITING STATE
(REWRITE SIGNAL A IS IN ON-STATE)

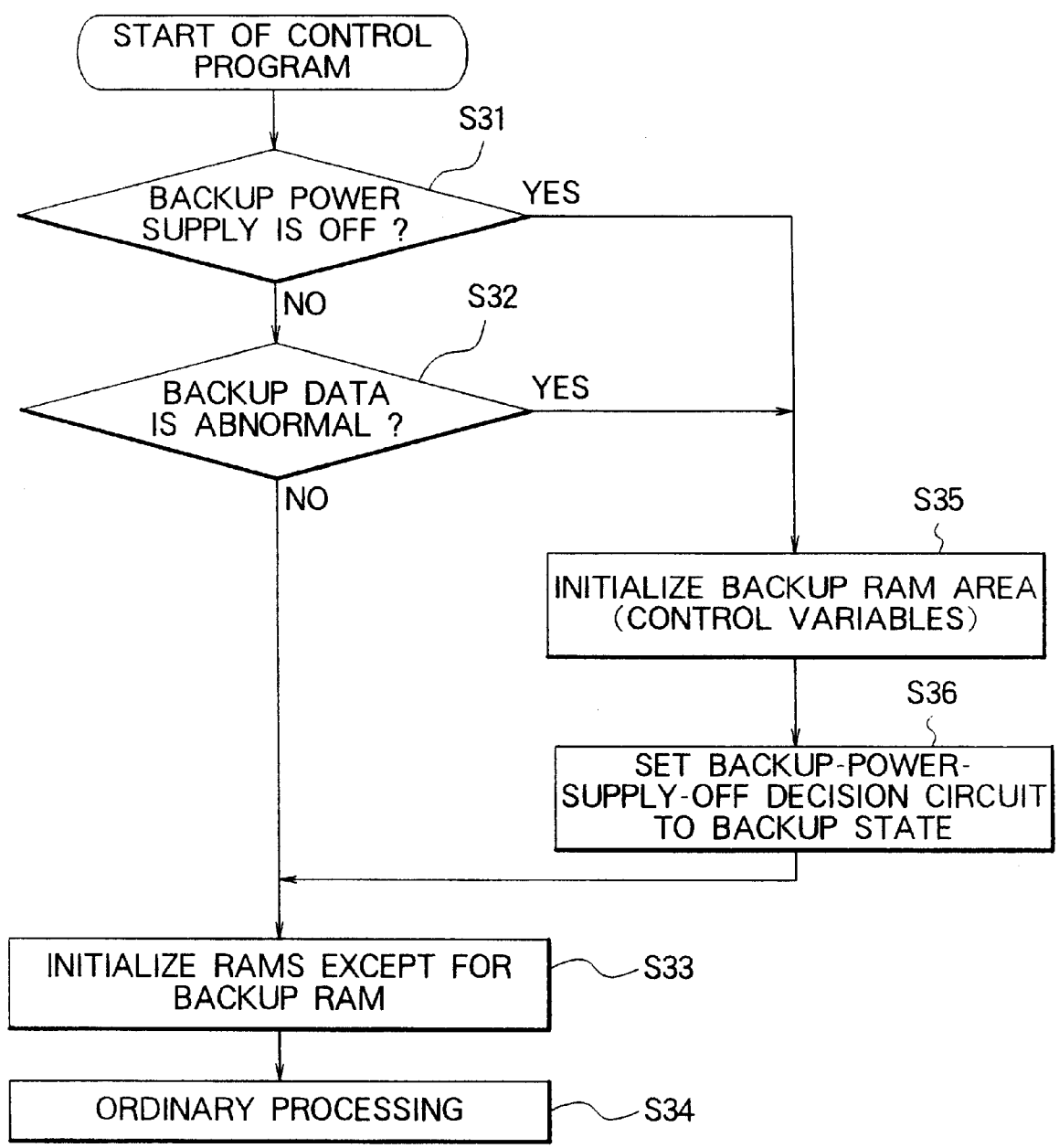

ONBOARD CONTROL SYSTEM FOR CONTROLLING DEVICES INSTALLED ON MOTOR VEHICLE AND METHOD OR REWRITING CONTROL PROGRAM AND VARIABLES THEREFOR

BACKGROUND OF THE INVENTION

1. Field of the Invention

The present invention relates generally to a vehicle-onboard control system for a motor vehicle, which system is installed on a motor vehicle and which includes a control apparatus such as an electronic control unit (also referred to as the ECU in abbreviation) for controlling devices mounted on the motor vehicle such as a power train composed of an internal combustion engine, a transmission and others. More specifically, the present invention is concerned with a vehicle-onboard control system which includes a backup random access memory (hereinafter also referred to as the backup RAM) for storing control variables and which can initialize automatically the backup RAM without fail when the specifications of a control program which is to run on a central processing unit or CPU incorporated in the control apparatus is altered or exchanged by a new one. Further, the invention is also concerned with a method of rewriting the control program and the control variables therefor.

2. Description of Related Art

For having better understanding of the present invention, description will first be made of the background technique thereof. FIG. 8 is a block diagram showing, by way of example, a general arrangement of a conventional vehicle-onboard control system (e.g. engine control apparatus) known heretofore.

Referring to the figure, the conventional vehicle-control system includes a control apparatus such as, for example, an engine control apparatus or ECU, which apparatus is comprised of a microcomputer 10, a reset control circuit 20 for initializing or resetting the operation state of the microcomputer 10, a backup power supply circuit 30 for backing up a power supply to the microcomputer 10, and an external input/output interface (not shown) for interconnecting an external control-destined object (which will be described later on) 40 to an input/output interface 16 incorporated in the microcomputer 10.

The microcomputer 10 in turn is comprised of a CPU (Central Processing Unit) 11 for controlling onboard apparatuses or devices 40 such as an internal combustion engine, a power train including a transmission and/or the like mounted on a motor vehicle, a writable non-volatile ROM (Read-Only Memory) 12 storing a control program or programs executed by the CPU 11 for controlling operations of the apparatus or device mentioned above, a bootstrap program 13 also executed by the CPU 11 for altering the program stored in the writable non-volatile ROM 12, and a backup RAM (Random Access Memory) 14 for storing control variables employed in the execution of the control program or programs.

The writable non-volatile ROM 12 is constituted by an erasable programmable read-only memory or EPROM in abbreviation such as a flush ROM.

Parenthetically, it should be mentioned that the bootstrap program 13 is stored also in a ROM which is provided separately from the writable non-volatile ROM 12.

Further, the microcomputer 10 is equipped with an address changing circuit 15 interposed between the CPU 11 on one hand and the writable non-volatile ROM 12 and the bootstrap program 13 on the other hand, wherein the address changing circuit 15 serves for changing over or switching the execution address of a memory map (described later on) of the CPU 11 to the bootstrap program 13 from the control program stored in the writable non-volatile ROM 12 upon rewriting of the control program.

Besides, the microcomputer 10 is provided with the input/output interface 16 and a backup-power-supply-off decision circuit 17 for making decision whether or not the power supply from the backup power supply circuit 30 is interrupted or off.

The CPU 11 incorporated in the microcomputer 10 is connected to a control-destined object or devices 40 (described hereinafter) by way of the input/output interface 16 and the external input/output interface (not shown). Ordinarily, the backup-power-supply-off decision circuit 17 holds the on-state information indicating that the backup power supply circuit 30 is validated. However, when the backup power supply circuit 30 is broken (i.e., assumes off-state) even once, the backup-power-supply-off decision circuit 17 is fixed to the state indicating the off-state of the backup power supply circuit 30.

The writable non-volatile ROM 12 storing the control program and the ROM storing the bootstrap program 13 both provided internally of the microcomputer 10 can be selectively connected to the CPU 11 via the address changing circuit 15, whereas the backup RAM 14, the input/output interface 16 and the backup-power-supply-off decision circuit 17 are connected directly to the CPU 11.

Furthermore, the backup RAM 14 and the backup-power-supply-off decision circuit 17 are connected to the backup power supply circuit 30 as well.

The input/output interface 16 provided internally of the microcomputer 10 is connected to an internal combustion engine 40 (hereinafter referred to as the engine in abbreviation) which constitutes one of the control-destined objects or devices via the external input/output interface (not shown) which constitutes a part of the vehicle-onboard control system, while the backup power supply circuit 30 is connected to an onboard battery 41 and other various vehicle-onboard control devices 42 (such as a telephone set, a time piece, a radio receiver and the like).

The backup RAM 14 is supplied with an electric power from the battery 41 by way of the backup power supply circuit 30.

A memory rewriting device 50 is adapted to be connected to the control apparatus 1 by way of a bidirectional communication line L upon rewriting or updating the control program stored in the writable non-volatile ROM 12 and so designed as to generate as output signals to this end a rewrite signal A for rewriting the control program stored in the writable non-volatile ROM 12 in accordance with updated specifications together with a command signal C and various data therefor (not illustrated).

In response to the rewrite signal A having the form of an on/off signal, the reset control circuit 20 and the address changing circuit 15 are put into operation, whereby the operation state (current address) of the CPU 11 is reset by a reset signal R generated by the reset control circuit 20 while the bootstrap program 13 is placed at the execution-destined address for the CPU 11 after having been reset.

The command signal C containing a command and data are inputted to the CPU 11 via the communication line L by way of an input/output interface (not shown) for thereby activating the bootstrap program 13 to execute the initialization processing for initializing or clearing the control program stored in the writable non-volatile ROM 12, the data check/rewrite processing and others.

FIGS. 9A and 9B are diagrams for illustrating inter-location relationship in the memory map as viewed from the CPU 11, wherein FIG. 9A shows an ordinary or normal state (where the rewrite signal A is invalid) and FIG. 9B shows a rewriting state (where rewrite signal A is validated).

Change of the individual memory areas from the ordinary or normal state (FIG. 9A) to the rewriting state (FIG. 9B) is realized by the address changing circuit 15, wherein the start addresses for execution of the control program after the resetting is allocated to a location corresponding to the bottom of the memory map.

More specifically, the rewrite bootstrap program 13 is located outside of the execution-destined address region (refer to phantom-line block 13 shown in FIG. 9A) externally of the memory map of the CPU 11 in the ordinary state (see FIG. 9A). However, when the control program rewrite operation is to be performed, the bootstrap program 13 is changed to the executable address position from which the CPU 11 can start the processing operation (see FIG. 9B).

FIGS. 10 to 12 are flow charts for illustrating processing routines executed by the bootstrap program 13, wherein FIG. 10 shows an initialization processing routine executed by the bootstrap program 13, FIG. 11 shows a serial interrupt processing routine (SCI routine) executed in response to the command signal C, and FIG. 12 is a flow chart for illustrating a write processing procedure executed in accordance with the bootstrap program 13 in response to the command signal C on the basis of the data signal. Furthermore, FIG. 13 is a flow chart for illustrating a processing routine executed in accordance with the updated control program stored in the writable non-volatile ROM 12.

Now referring to FIGS. 9 to 13 in combination with FIG. 8, operation of the conventional vehicle-onboard control system known heretofore will be explained.

The CPU 11 incorporated in the control apparatus 1 ordinarily executes the control program which is located at the executable address area of the memory map (i.e., the program written in the writable non-volatile ROM 12) as shown in FIG. 9A, to thereby perform control of operation of the engine 40. On the other hand, when the control program is to be rewritten in accordance with the updated specifications for the engine control, the CPU 11 executes the bootstrap program 13 which is then located at the executable address area as shown in FIG. 9B.

In general, in the vehicle-onboard control system destined for controlling the onboard devices such as the engine 40 and others of a motor vehicle, the control program stored in the writable non-volatile ROM 12 is rewritten in accordance with the specifications as renewed or updated. In that case, in order to prevent the rewrite processing program from being erased even when the contents of the writable non-volatile ROM 12 is erased, rewriting of the control program is executed by the bootstrap program 13 which is stored in a ROM provided separately or independently from the writable non-volatile ROM 12.

Furthermore, in conjunction with the changing-over of the programs (i.e., the control program and the bootstrap program) to be executed by the CPU 11, it should be mentioned that the address changing circuit 15 incorporated in the microcomputer 10 selects the control program stored in the writable non-volatile ROM 12 (see FIG. 9A) when the rewrite signal A generated by the memory rewriting device 50 is in the off-state (ordinary state) while selecting the bootstrap program 13 (see FIG. 9B) when the rewrite signal A is in the on-state commanding the rewriting of the control program.

More specifically, in response to the change of the rewrite signal A from the off-state to the on-state, the program executed by the CPU 11 is changed from the control program stored in the writable non-volatile ROM 12 to the bootstrap program 13 stored in another ROM, whereas in response to the change of the rewrite signal A from the on-state to the off-state, the program executed by the CPU 11 is changed from the bootstrap program to the control program stored in the writable non-volatile ROM 12. Furthermore, upon every changing of the state of the rewrite signal A, the reset signal R is generated by the reset control circuit 20.

In this way, the control program or the bootstrap program 13 is executed, starting from the execution-destined address after the resetting brought about by the reset signal R.

In this conjunction, it is noted that there may arise such situation in which the control variables such as learned values stored in the backup RAM 14 are not altered or updated even when the control program stored in the writable non-volatile ROM 12 is altered or updated. In that case, the CPU 11 will execute the altered or updated control program by using the control variables remaining intact in the backup RAM 14 (i.e., the control variables used by the preceding control program), which will result in erroneous control of operation of the internal combustion engine 40 and/or other devices mounted on the motor vehicle.

For the reason mentioned above, when the control program stored in the writable non-volatile ROM 12 is altered, it is necessary to initialize the control variables stored in the backup RAM 14 to values conforming with the renewed specifications reflected by the altered control program in order to evade inconveniences or problems ascribable to mismatching between the altered or updated control program and the control variables employed in the preceding control program.

Such being the circumstances, there has heretofore been adopted such a method that upon rewriting of the control program, the power supply to the backup power supply circuit 30 from the battery 41 is temporarily interrupted by disconnecting the battery 41 from the vehicle-onboard control system so that initialization of the backup RAM 14 can be validated on the basis of the information available from the backup-power-supply-off decision circuit 17 upon reactivation of the control program.

Furthermore, there has been also adopted such a method according to which a decision reference value stored in the writable non-volatile ROM 12 is compared with a predetermined certain value stored in the backup RAM 14 to thereby initialize the backup RAM 14 when discrepancy is found between the decision reference value and the predetermined certain value as a result of the comparison.

Now, when the control program stored in the ROM 12 is to be rewritten, the CPU 11 incorporated in the control apparatus 1 responds to the command signal C issued by the memory rewriting device 50 to activate the bootstrap program 13 to thereby execute various initialization processings, as shown in FIG. 10. More specifically, in a step S1 shown in FIG. 10, a serial interrupt processing via the serial communication line L is enabled, and a write flag FW in a given register (not shown) is cleared, whereby the CPU 11 is set to the standby state ready for executing the interrupt processing routine.

Subsequently, the interrupt processing routine shown in FIG. 11 is activated in response to the command signal C, and it is decided in a step S11 whether or not the write flag FW is set. When the write flag FW is set (i.e., when the answer of the decision step S11 is affirmative or "YES"), a write processing for altering the control program is executed in a step S12, whereupon return is made to the interrupt processing routine enabling state.

Parenthetically, in the initial state, the write flag FW is cleared in the step S1 shown in FIG. 10. Consequently, the decision step S11 will result in negation or "NO", which is then followed by a decision step S13 where it is decided whether the command signal C represents a command for initialization (i.e., initialize command) or not.

When decision is made in the step S13 that the command signal C is the initialize command (i.e., when the answer of the step S13 is "YES"), the content of the writable non-volatile ROM 12 is erased in a step S14, whereupon the interrupt processing routine enabling state (i.e., the start state) is resumed. On the contrary, when it is decided that the command signal C is not the initialize command (i.e., when the step S13 results in "NO"), then decision is made whether the command signal C represents a check sum command in a step S15.

When the command signal C is a check sum command, values of all the memory locations of the writable non-volatile ROM 12 are summed up to determine a total sum value which is then sent to the memory rewriting device 50 in a step S16, whereupon return is made to the interrupt processing routine enabling state.

In that case, when the total sum value of the writable non-volatile ROM 12 is abnormal, it is then determined that the rewriting of the control program has not been executed accurately. Thus, the rewrite processing based on the data signal is again commanded by the memory rewriting device 50.

Further, when it is decided in the step S15 that the command signal C does not represent the check sum command (i.e., when the answer of this step is "NO"), then a step S17 is executed to decide whether the command signal C is a write command or not.

When the command signal C is decided as the write command (i.e., when the step S17 results in "YES"), the write flag FW is set and at the same time a counter CNT1 which serves for counting the number of data stored in the writable non-volatile ROM 12 is cleared in a step S18, whereon the interrupt processing routine enabling state is regained.

On the other hand, when decision is made that the command signal C is not the write command (i.e., when the step S17 results in "NO"), this means that the command signal C can not discriminatively be identified. In that case, a signal indicative of an error state is sent to the memory rewriting device 50 (step S19), whereupon the processing returns to the interrupt processing routine enabling state (start state).

The memory rewriting device 50 responds to the error signal to thereby output again the command signal C.

The write processing step S12 shown in FIG. 11 is executed in such a manner as illustrated in FIG. 12.

Referring to FIG. 12, the leading address of the writable non-volatile ROM 12 is added with the address of the counter CNT1, and the received data (i.e., data supplied in terms of the data signal) is written at the address obtained from the above-mentioned addition (step S21), whereon the value of the counter CNT1 is incremented by one (step S22).

However, in the initial state, the counter CNT1 is cleared in the step S18 shown in FIG. 11. Accordingly, incrementation of the counter CNT1 is repeated until a predetermined data number N has been reached (step S22).

In succession, it is determined whether or not data have been written in all the memory areas by checking whether or not the content of the counter CNT1 has reached or exceeded the predetermined number N of data in a step S23. When decision is made that the counter value CNT1 is smaller than N (i.e., when the decision step S23 results in "NO"), the processing immediately proceeds to the exit to leave the write processing routine shown in FIG. 12.

By contrast, when the above decision results in that CNT1≧N (i.e., "YES"), the check sum value of the writable non-volatile ROM 12 is sent to the memory rewriting device 50 (step S24), and the write flag FW is cleared (step S25), whereon the processing leaves the write routine shown in FIG. 12.

In this way, by executing the bootstrap program 13, the control program stored in the writable non-volatile ROM 12 is updated so as to conform with the new specifications of the control-destined object.

Subsequently, the memory rewriting device 50 turns off the rewrite signal A from the on-state thereof, whereby the updated control program is activated, as is illustrated in FIG. 13.

In this case, the CPU 11 checks the state of the backup-power-supply-off decision circuit 17 to thereby decide whether the backup power supply circuit 30 is in the off-state or not (step S31).

When decision is made that the backup power supply circuit 30 has not been turned off at all but remains in the backup state (i.e., when the answer of the step S31 is "NO"), the decision reference value stored in the writable non-volatile ROM 12 is compared with the predetermined certain value stored in the backup RAM 14, as mentioned previously. In dependence on whether or not both values mentioned above coincide with each other, it is decided that the data (control variables) held in the backup RAM 14 are normal or alternatively abnormal (step S32).

When the predetermined value held in the backup RAM 14 coincides with the decision reference value stored in the writable non-volatile ROM 12, indicating that the data for the control variables are normal, then initialization processing is performed for the other RAMs than the backup RAM 14 (step S36), which is then followed by execution of ordinary control processing (step S34).

On the other hand, when it is decided that the backup power supply is off or backup data is abnormal in the step S31 or S32, the memory areas of the backup RAM 14 are initialized (step S35), whereupon the backup-power-supply-off decision circuit 17 is set to the backup state (i.e., initialized).

In the initialize step S35, the predetermined value held in the backup RAM 14 is so altered as to coincide with the decision reference value stored in the writable non-volatile ROM 12.

Thus, by disconnecting the vehicle-onboard control system from the battery 41 by manual operation after updating of the control program, the control variables stored within the backup RAM 14 can equally be initialized.

Further, when the data stored in the backup RAM 14 indicates an abnormal value, the backup RAM 14 can be initialized.

However, when the battery 41 is disconnected every time the control program is altered so as to conform with the updated specifications, the contents of other RAMs used by other various onboard control devices 42 which utilize in common the backup power supply circuit 30 are also cleared. In that case, it becomes necessary to initialize the other backup RAMs (not shown) provided for the various vehicle-onboard control devices 42. Thus, overhead involved in the rewriting process increases remarkably, to a great disadvantage.

Besides, when manual operation for disconnecting the backup power supply circuit 30 after updating the control program is not effected inadvertently, then the initialization processing of the backup RAM 14 can not be executed unless abnormality is decided in the step S32 shown in FIG. 13, giving rise to a problem that proper control as desired can not be performed due to unsuitableness of the control variables, because the control variables for the preceding control program are then used by the altered control program.

Additionally, when the control apparatus 1 and the motor vehicle are disconnected and reconnected after rewriting of the writable non-volatile ROM 12, omission of disconnection of the backup power source will bring about a serious problem. Moreover, an increased number of process steps involved in the alteration of the control program due to disconnection and reconnection of the battery or the backup power supply circuit provides a cause for high expensiveness.

As will now be appreciated from the foregoing, in the conventional vehicle-onboard control system for the motor vehicle, the backup power supply circuit 30 is disconnected through manual operation upon rewriting of the control program stored in the writable non-volatile ROM 12. Consequently, when disconnection of the backup power supply circuit 30 is omitted for some reason, initialization of the backup RAM 14 can not be effected unless abnormality of the backup data is decided, which gives birth to a problem that inconvenience will be incurred in controlling the onboard devices such as the internal combustion engine and others because of unfitness of the control variables held in the backup RAM 14.

SUMMARY OF THE INVENTION

In the light of the state of the art described above, it is an object of the present invention to provide a vehicle-onboard control system which is imparted with facility for automatically initializing the contents of the backup RAM when a control program running on a control apparatus of the vehicle-onboard control system is rewritten or updated so as to conform with renewed specifications of an object for control.

Another object of the invention is to provide a method of rewriting the control program stored in a writable non-volatile ROM and control variables stored in a backup Ram.

In view of the above and other objects, there is provided according to an aspect of the present invention a vehicle-onboard control system installed on a motor vehicle for controlling at least one device mounted on the vehicle, which system includes a central processing unit or CPU for executing a control program by using various control variables to thereby control the device mounted on the motor vehicle, a writable non-volatile ROM for storing the control program, a backup random access memory or RAM for storing the control variables, a backup power supply circuit for supplying electric power to the backup RAM, a bootstrap program for operating the CPU to allow the control program to be rewritten, an address changing circuit for locating the bootstrap program at an address executable by the CPU upon rewriting of the control program, and a memory rewriting device for outputting a rewrite signal for actuating the address changing circuit and a command signal for activating the bootstrap program. An initialization flag adapted to be set by the bootstrap program in response to the command signal upon rewriting of the control program is provided in the backup RAM. The control program responds to the set state of the initialization flag upon activation of the control program after having been rewritten, to thereby, initialize the control variables stored in the backup RAM.

By virtue of the arrangement of the vehicle-onboard control system that the initialization flag set by the bootstrap program in response to the command signal upon rewriting of the control program is provided in the backup RAM, wherein upon activation of the control program undergone the rewrite processing, the control program initializes the control variables stored in the backup RAM in response to the set state of the initialization flag by rewriting directly the control variables, as described above, the difficulty ascribable to unfitness of the control variables stored in the backup RAM, as mentioned hereinbefore, can be avoided without fail with a simple system configuration and a procedure easy to execute.

According to another aspect of the invention, there is provided a vehicle-onboard control system which includes a central processing unit or CPU for executing a control program by using various control variables to thereby control the device mounted on the motor vehicle, a writable non-volatile ROM for storing the control program, a backup random access memory or RAM for storing the control variables, a backup power supply circuit for supplying electric power to the backup RAM, a bootstrap program for operating the CPU to allow the control program to be rewritten, an address changing circuit for locating the bootstrap program at an address executable by the CPU upon rewriting of the control program, and a memory rewriting device for outputting a rewrite signal for actuating the address changing circuit and a command signal for activating the bootstrap program. The control program is so designed as to compare a decision reference value stored in the writable non-volatile ROM with a predetermined value stored in the backup RAM to thereby initialize the backup RAM when discrepancy is detected between the decision reference value and the predetermined value. The bootstrap program responds to the command signal to thereby update the decision reference value to an abnormal value. Thus, the control program initializes the backup RAM in response to discrepancy between the abnormal value and the predetermined value upon activation of the control program after having been rewritten.

In the vehicle-onboard control system in which the decision reference value stored in the writable non-volatile ROM is compared with the predetermined value stored in the backup RAM, wherein upon detection of discrepancy between the decision reference value and a predetermined value, the backup RAM is initialized, because the bootstrap program changes the decision reference value to the abnormal value in response to the command signal, while the control program responds to the discrepancy between the abnormal value and the predetermined value to thereby initialize the backup RAM, as described above, undesirable control operation ascribable to unfitness of the control variables stored in the backup RAM can be evaded more positively with a simple system configuration and a procedure easy to execute.

Further provided according to a further aspect of the invention is a vehicle-onboard control system which includes a central processing unit or CPU for executing a control program by using various control variables to thereby control the device mounted on the motor vehicle, a writable non-volatile ROM for storing the control program, a backup random access memory or RAM for storing the control variables, a backup power supply circuit for supplying electric power to the backup RAM, a bootstrap program for operating the CPU to allow the control program to be rewritten, an address changing circuit for locating the bootstrap program at an address executable by the CPU upon rewriting of the control program, and a memory rewriting device for outputting a rewrite signal for actuating the address changing circuit and a command signal for activating the bootstrap program. A control variable processing flag adapted to be set in response to the command signal upon rewriting of the control program is provided. The memory rewriting device outputs a control variable data signal together with the command signal. The command signal contains a control variable initialize command. The control variable data signal contains a number of data for rewriting the control variables, a start address for the rewriting and data for initialization. The control variable processing flag is set up in response to the control variable initialize command. When the control program is rewritten, the bootstrap program responds to the set state of the control variable processing flag to thereby initialize in accordance with the data for initialization the control variables stored at memory locations of the backup RAM which are determined by the number of the data for rewriting and the rewrite start address.

Owing to the arrangement of the vehicle-onboard control system described above that the control variable processing flag which is set up in response to the command signal upon rewriting of the control program, wherein the memory rewriting device outputs the command signal containing the control variable initialize command together with the control variable data signal containing the number of data for the rewriting, the rewrite start address and the initialization data, while the control variable processing flag is set up in response to the control variable initialize command, while the bootstrap program responds to the set state of the control variable processing flag to thereby initialize the control variables stored at locations in the backup RAM determined by the number of the data for rewriting and the rewrite start address, there can be obtained an advantageous effect that only the concerned locations in the backup RAM can be initialized.

Furthermore, in a vehicle-onboard control system installed on a motor vehicle for controlling at least one device mounted on the vehicle, which system includes a CPU for executing a control program by using various control variables to thereby control the device mounted on the motor vehicle, a writable non-volatile ROM for storing the control program, a backup RAM for storing the control variables, a bootstrap program for operating the CPU to allow interrupt processing routines to be executed thereby, and switching means for changing over the bootstrap program and the control program with one another for execution by the CPU, there is provided according to a further aspect of the present invention a method which includes the steps of issuing a command signal for activating the bootstrap program to rewrite the control program, and providing information for allowing an altered control program resulting from the rewriting to initialize the control variables so that the control variables conform with the altered control program.

In a mode for carrying out the method mentioned above, the information represents an initialization flag set up in the backup RAM by the bootstrap program, wherein the altered control program checks the initialization flag upon activation to thereby initialize the control variables stored in the backup RAM when the initialization flag is set up.

In another mode for carrying out the aforementioned method, the information represents an abnormal value of a given one of the control variables stored in the backup RAM, wherein the abnormal value being set in the altered control program and wherein the altered control program compares upon activation thereof the abnormal value and the given one value to thereby initialize the control variables stored in the backup RAM when the comparison results in discrepancy.

In yet another mode for carrying out the method mentioned above, the information represents a control variable initialize command contained in the command signal, and wherein the method further comprises the steps of issuing a control variable data signal together with the command signal, and setting a control variable processing flag in response to the control variable initialize command, and wherein upon rewriting of the control program, the bootstrap program responds to the set state of the control variable processing flag to thereby initialize the control variables stored at memory locations of the backup RAM in accordance with the control variable data signal.

With the methods mentioned above, the objects contemplated by the invention can equally be achieved successfully.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIGS. 9A and 9B are diagrams for illustrating change of a memory map for a central processing unit upon rewriting of a control program, wherein FIG. 9A shows an ordinary or normal state, while FIG. 9B shows a rewriting state;

FIG. 13 is a flow chart for illustrating a processing effected by a conventional control program in the control system shown in FIG. 8.

DESCRIPTION OF THE PREFERRED EMBODIMENTS

Figure 1:
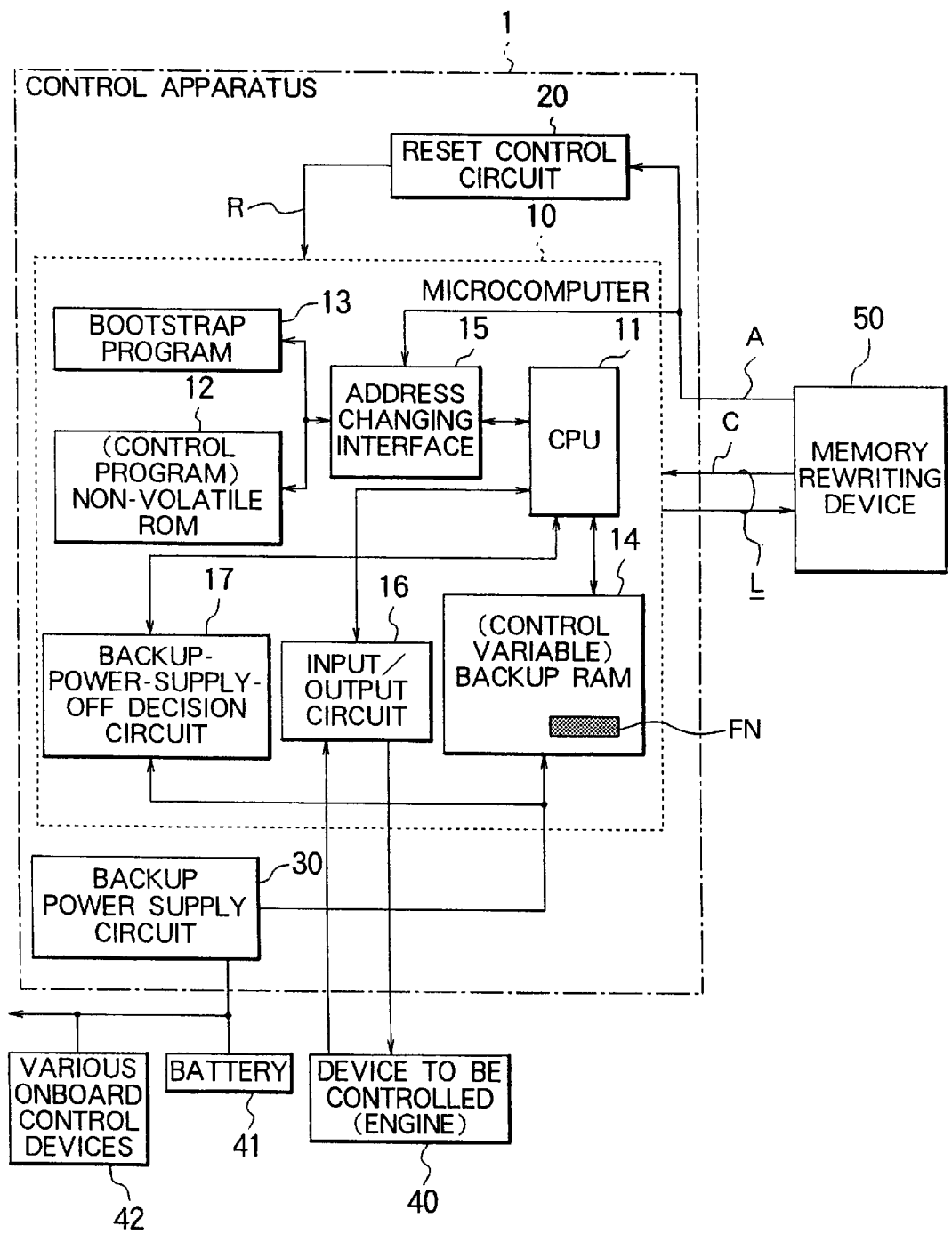
FIG. 1 is a block diagram showing generally an arrangement of a vehicle-onboard control system according to a first embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

Figure 8:
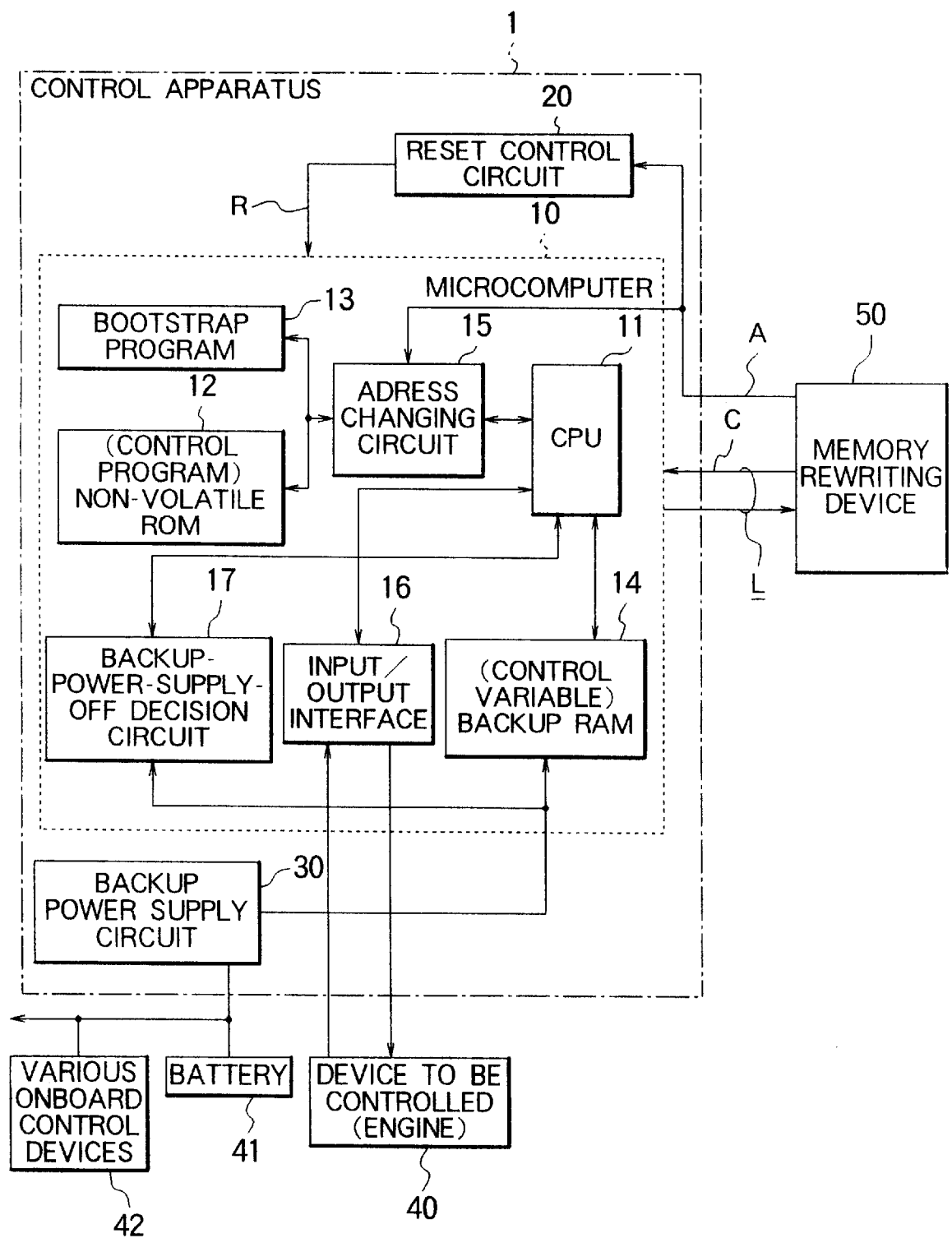
FIG. 8 is a block diagram showing generally an arrangement of a conventional vehicle-onboard control system known heretofore.

FIG. 1 is a block diagram showing generally an arrangement of the vehicle-onboard control system according to a first embodiment of the present invention. In the figure, components like as or equivalent to those described hereinbefore by reference to FIG. 8 are designated by like reference characters and repeated description in detail is omitted.

According to the teaching of the invention incarnated in the first embodiment, an initialization flag FN is provided in the backup RAM 14 as control program rewrite information.

More specifically, the initialization flag FN is set up by the bootstrap program 13 in response to the command signal C issued by the memory rewriting device 50 upon rewriting of the control program, wherein the control program is so realized as to initialize the control variables stored in the backup RAM 14 in response to the set state of the initialization flag FN at a time point the control program is activated after completion of the rewriting processing. To say in another way, the control variables stored in the backup RAM 14 are initialized by the updated or renewed control program. this end, the command signal C contains a control variable initialize command for setting up the initialization flag FN.

Figure 2:
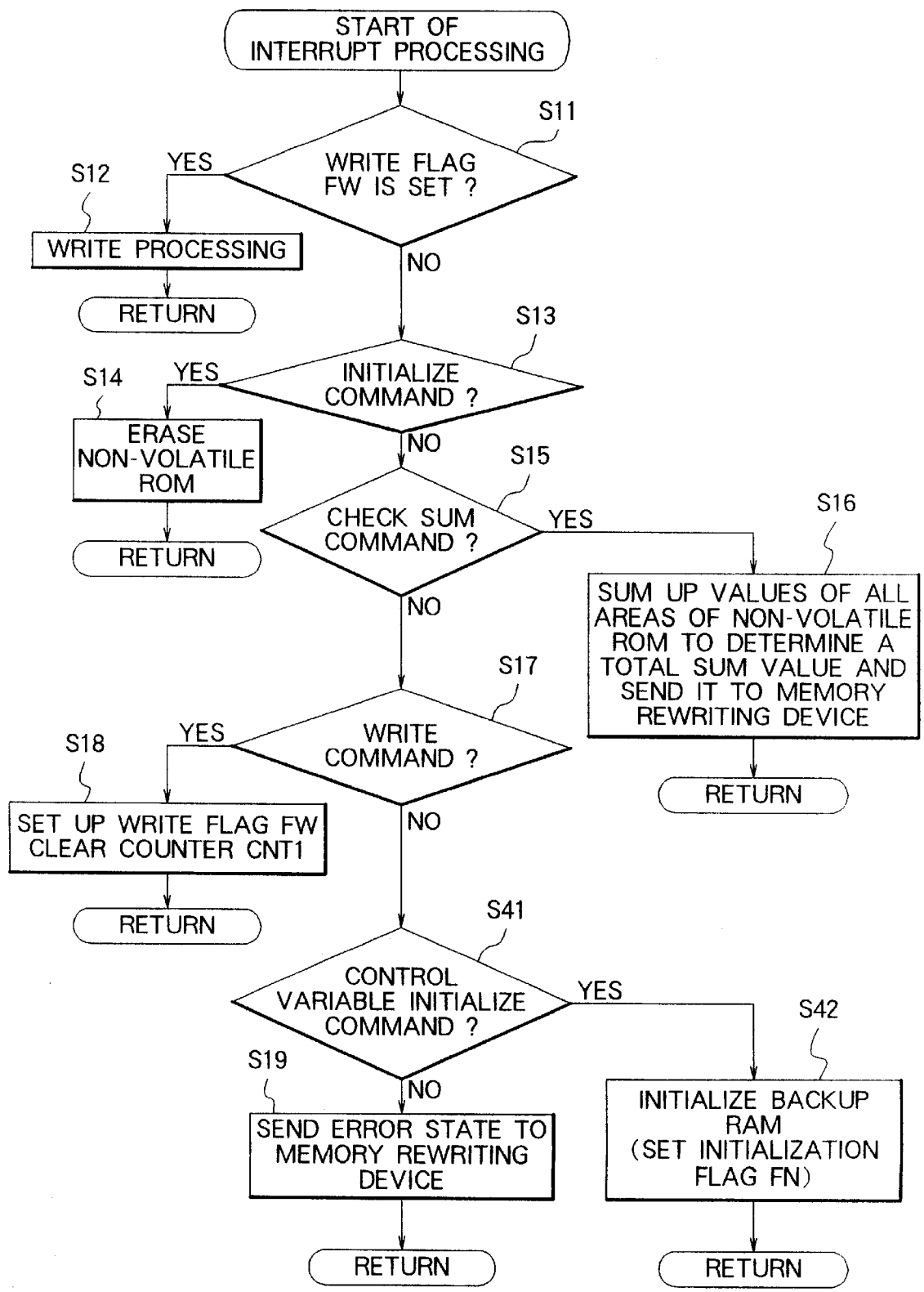
FIG. 2 is a flow chart for illustrating an interrupt processing operation in the vehicle-onboard control system according to the first embodiment of the invention.
Figure 3:
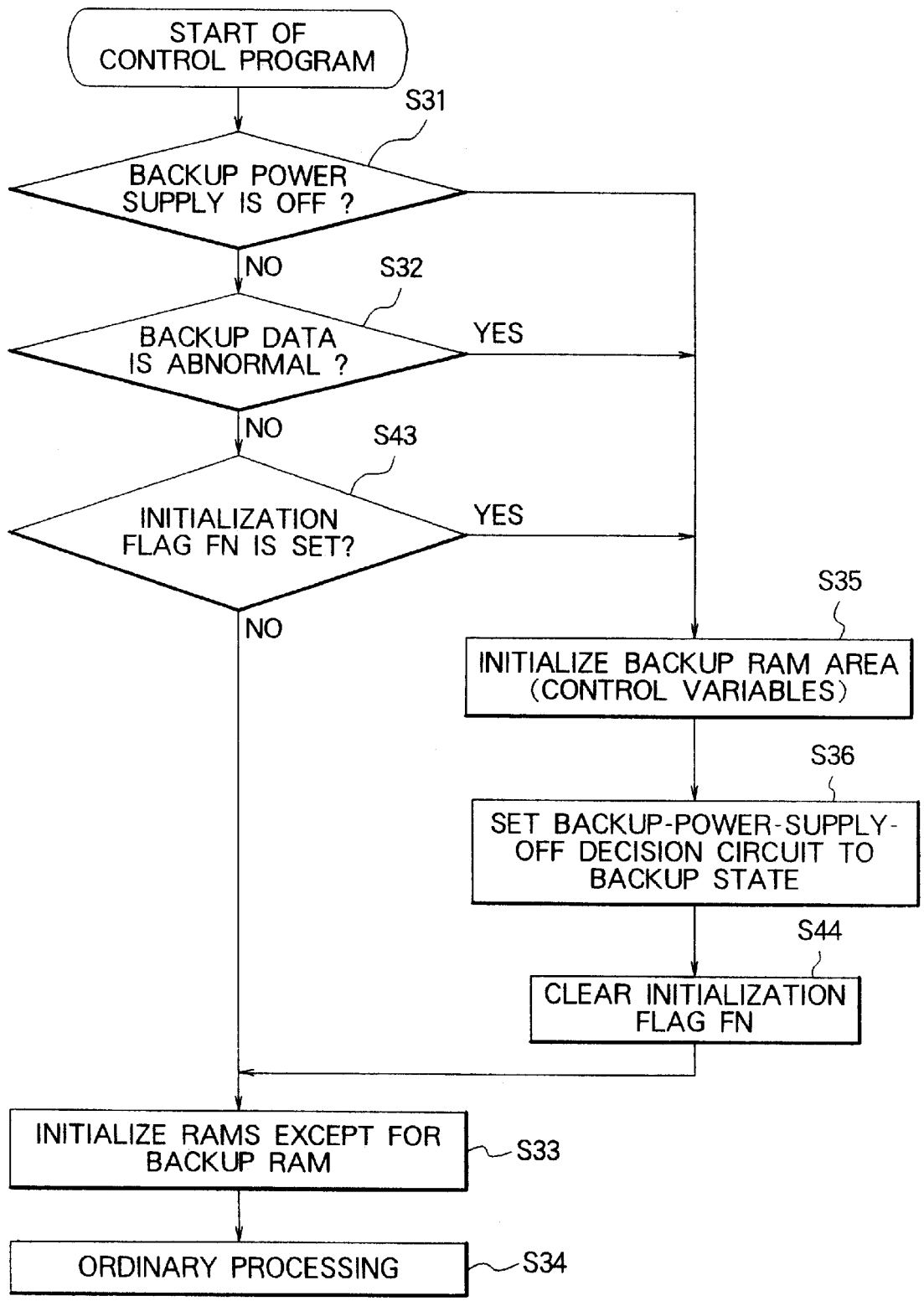
FIG. 3 is a flow chart for illustrating a processing executed by a control program after rewrite operation in the vehicle-onboard control system according to the first embodiment of the invention.

Next, referring to flow charts shown in FIGS. 2 and 3, operation of the vehicle-onboard control system according to the first embodiment of the invention will be elucidated.

Figure 11:
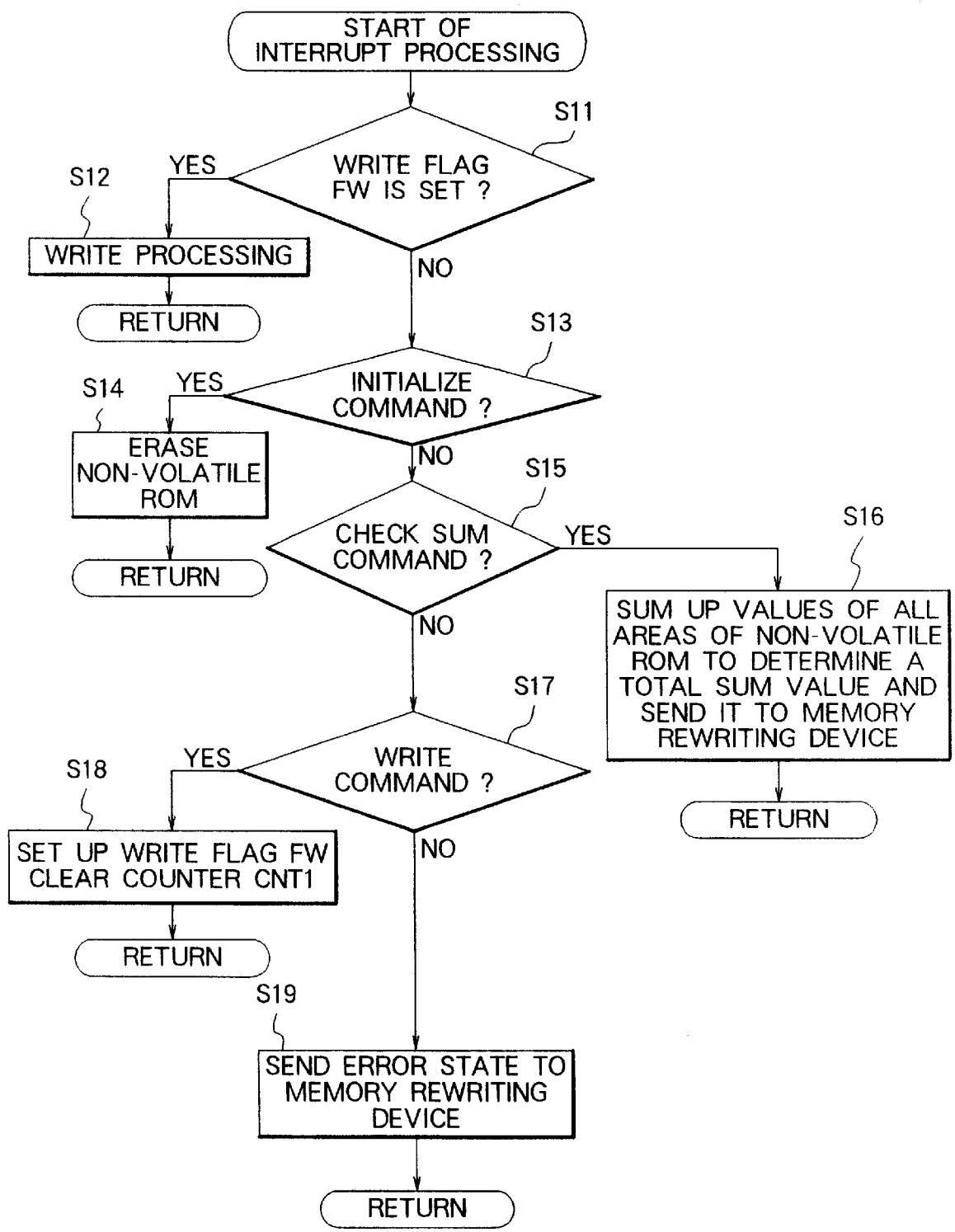
FIG. 11 is a flow chart for illustrating conventional interrupt processing in the vehicle-onboard control system.

In this conjunction, FIG. 2 shows an interrupt processing routine which corresponds to the interrupt processing described previously by reference to FIG. 11, while FIG. 3 shows a control program processing routine corresponding to that shown in FIG. 13. In reality, except for addition of steps S41 to S44, the routines shown in FIGS. 2 and 3 are substantially same as those shown in FIGS. 11 and 13, respectively. In more concrete, the steps S11 to S19 and S31 to S36 are executed similarly to those designated by like reference characters in FIGS. 11 and 13.

Figure 9A:
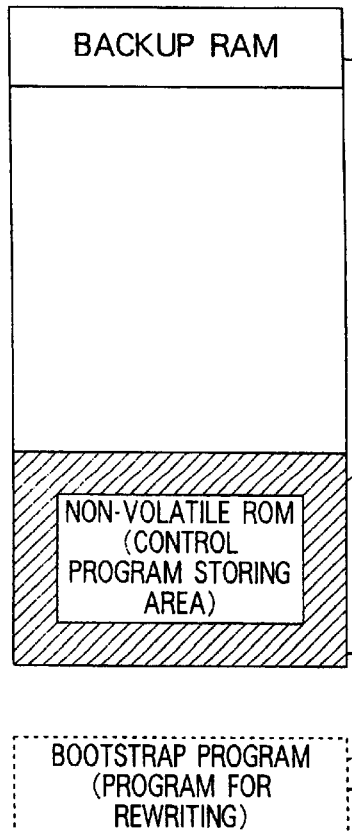
Figure 9B:
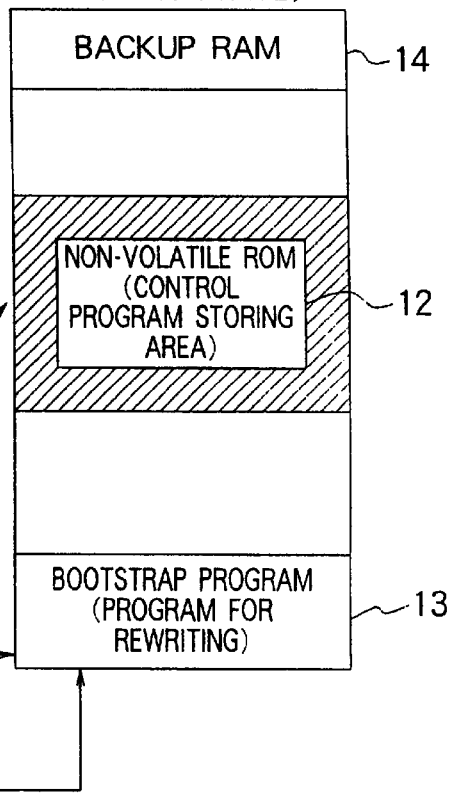
Figure 10:
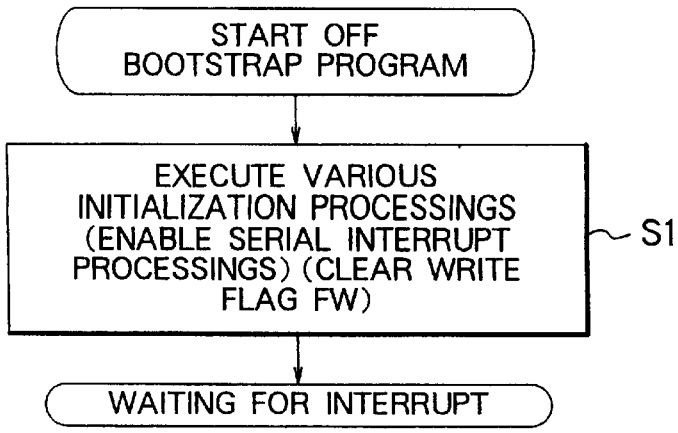
FIG. 10 is a flow chart for illustrating effected by a bootstrap program in the conventional control system shown in FIG. 8.
Figure 12:
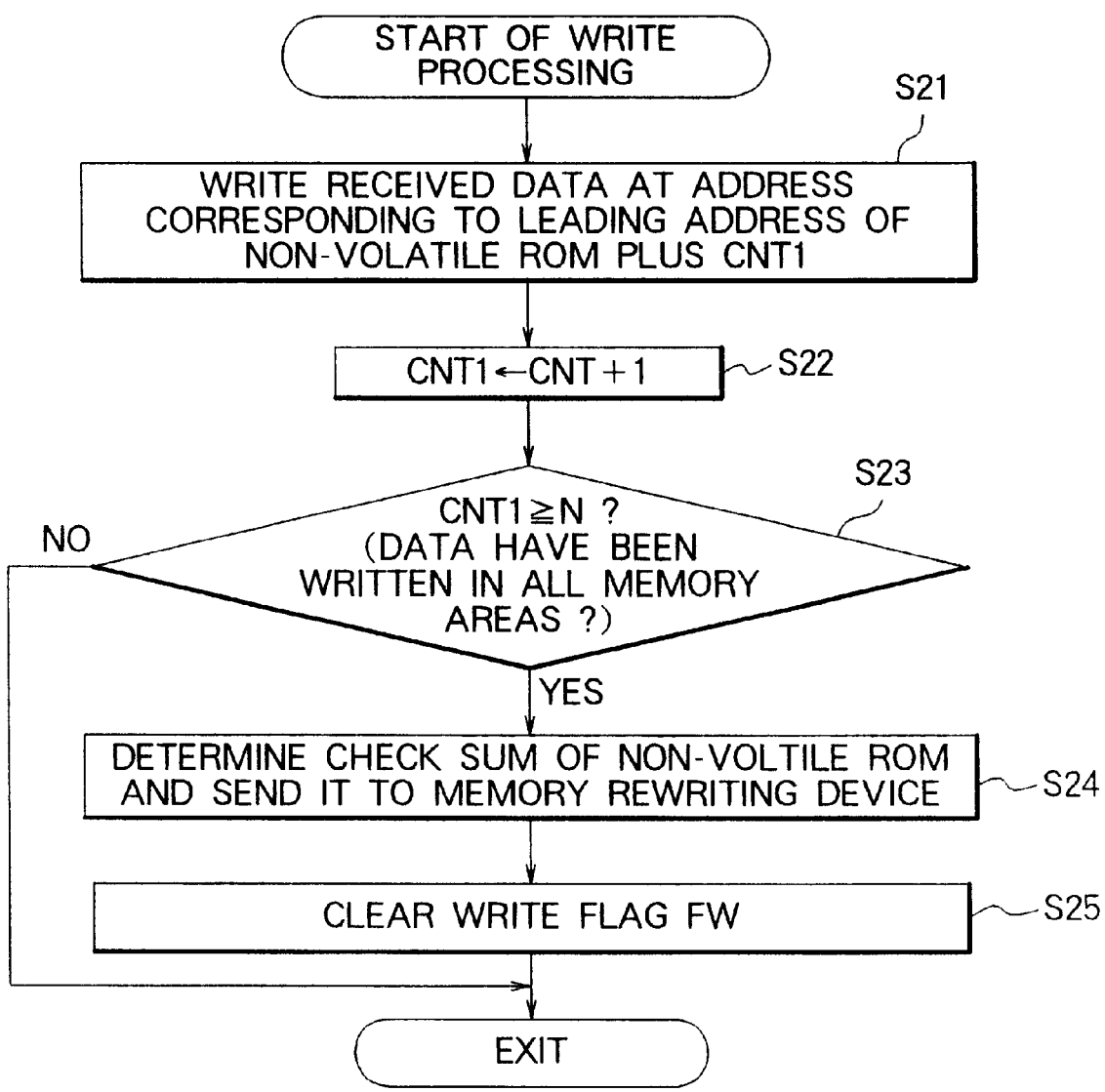
FIG. 12 is a flow chart for illustrating conventional updating write processing operation in the control system.

Besides, the remaining routines and operations not shown in FIGS. 2 and 3 are essentially same as those described hereinbefore by reference to FIGS. 9, 10 and 12. Thus, repetitive description of the same operations as those elucidated previously will be unnecessary.

At first, the rewrite signal A is changed over from the off-state to the on-state. Then, the address of the memory map which determines operation of the CPU (Central Processing Unit) 11 is changed to the rewrite state illustrated in FIG. 9B, whereupon the processing executed in accordance with the bootstrap program 13 is started (see FIG. 10).

Namely, in response to the reset signal R issued by the reset control circuit 20, serial communication via the communication line L is enabled after initialization (step S1), whereby the communication waiting state is established.

Subsequently, upon inputting of the serial command signal C from the memory rewriting device 50 by way of the communication line L, interruption takes place to activate the interrupt processing routine shown in FIG. 2.

When the command signal C represents an initialize command or check sum or a write command, the processing is executed in accordance with the subroutine including the steps S11, . . . , S18, as described hereinbefore.

On the other hand, in case the command signal C is neither the initialize command nor the check sum command and when it is decided in the step S17 that the command signal C is not the write command (i.e., when the decision step S17 results in "NO"), it is then decided in the step S41 whether or not the command signal C represents a control variable initialize command. When the result of this decision step S41 is negative "NO" (i.e., unless the command signal C represents the control variable initialize command), the processing then proceeds to the error communication step S19.

By contrast, when it is decided in the step S41 that the command signal C is the control variable initialize command (i.e., when the decision step S41 results in affirmation "YES"), the initialization flag FN is set up in the backup RAM 14 (step S42), and the interrupt processing routine is resumed.

When the operation for writing data to the control program (see FIG. 12) has been completed with the processing executed by the bootstrap program 13 being terminated, the memory map addresses of the CPU 11 is changed over to the ordinary operation state such as illustrated in FIG. 9A in response to the state change-over of the rewrite signal A from the on-state to the off-state, whereby the processing routine (FIG. 3) of the control program 13 is started.

In more concrete, when it is decided in the step S31 and step S32 that the backup power source is off and that abnormality occurs in the backup data, respectively, the initialization processing for the backup RAM 14 (step S35) and the reset processing for the backup-power-supply-off decision circuit 17 (step S36) are executed, as described previously.

On the other hand, in case decision is made that the backup power source is not off and that the backup data suffers no abnormality and it is decided in the step S32 that the backup data is normal (i.e., when the answer of the decision step S32 is "NO"), decision is then made as to whether the initialization flag FN is set up or not in the step S43. Unless the initialization flag FN is set up (i.e., when the decision step S43 results in "NO"), the processing then proceeds to the initialization step S33 for the other RAMs than the backup RAM 14.

On the other hand, when it is decided in the step S43 that the initialization flag FN is set up (i.e., when the step S43 results in "YES"), the initialization step S35 for the backup RAM 14 is executed. Thereafter, the backup-power-supply-off decision circuit 17 is reset to the backup state in the step S36 with the initialization flag FN being cleared in the step S44, whereupon the processing proceeds to the step S33.

In this manner, upon rewriting of the control program stored in the writable non-volatile ROM 12, the initialization flag FN provided in the backup RAM 14 by the bootstrap program 13, and the control program rewritten makes reference to the initialization flag FN upon activation thereof after rewriting, to thereby initialize automatically the control variables stored in the backup RAM 14 so that the control variables are compatible with the control program rewritten or updated in accordance with the renewed specifications.

In this manner, the inconvenience that the control variables stored in the backup RAM 14 become unfit to the altered control program can be avoided without fail.

Besides, it should be noted that only the control apparatus 1 for which the updating of the control program and hence the initialization of the control variables are required can be initialized in the state where it is mounted on the motor vehicle without affecting the other control apparatuses.

Embodiment 2

In the vehicle-onboard control system according to the first embodiment of the invention, the initialization flag FN is provided in the backup RAM 14 as the information for initialization of the control variables. However, instead of providing the initialization flag FN, a decision reference value which differs from a predetermined value stored in the backup RAM 14 may be provided in the control program to thereby allow the renewed control program to make abnormality decision in the backup data abnormality decision step S32 (see FIGS. 3 and 13). A second embodiment of the present invention is directed to this arrangement.

Figure 4:
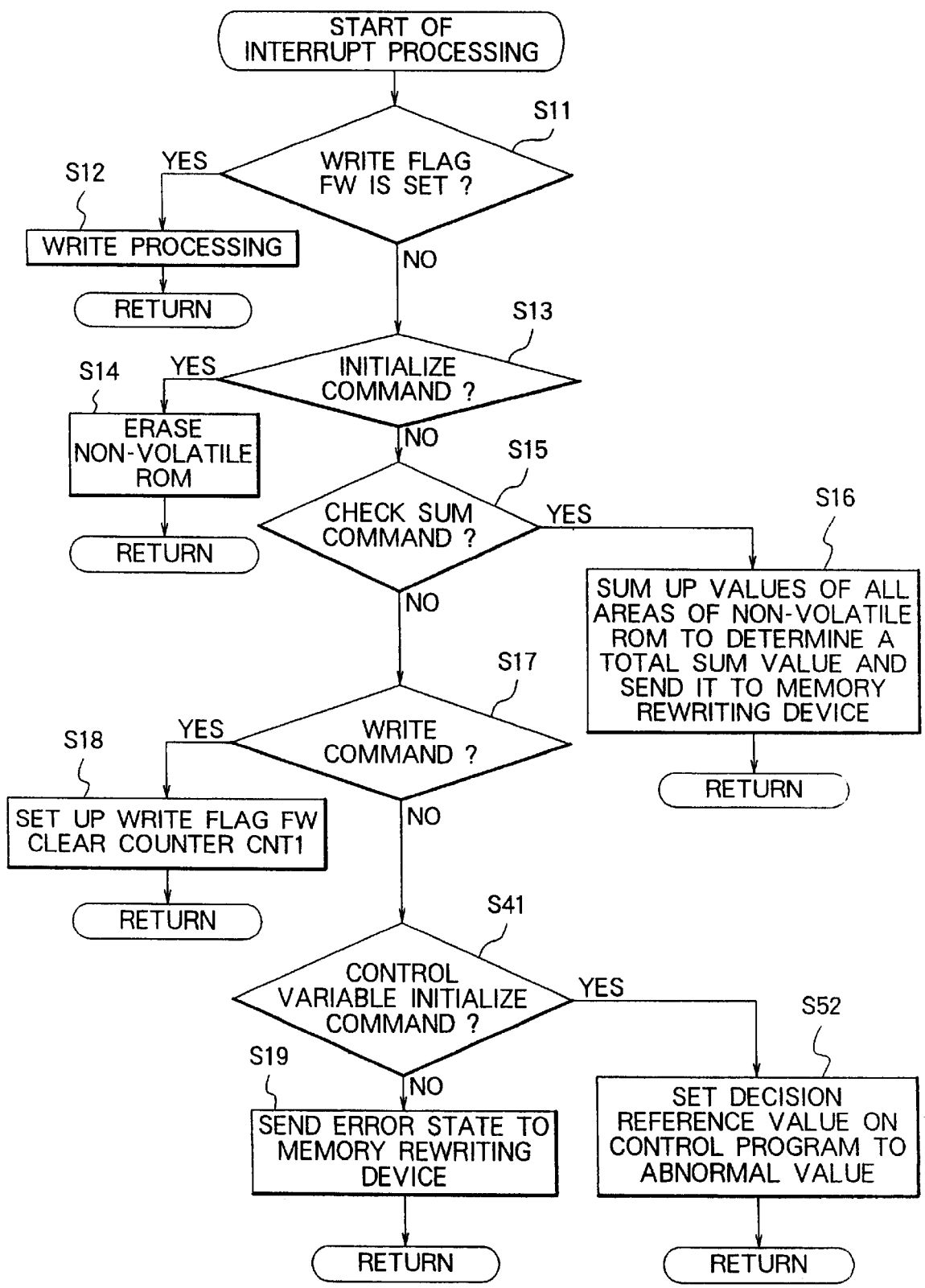
FIG. 4 is a flow chart for illustrating an interrupt processing operation in a vehicle-onboard control system according to a second embodiment of the present invention.

Now, description will be directed to operation of the vehicle-onboard control system according to the second embodiment by reference to a flow chart shown in FIG. 4 which shows an interrupt processing routine corresponds to that described previously by reference to FIG. 2. As can be seen in the figure, except that the step S42 is replaced by a step S52, the routine shown in FIG. 4 is substantially same as that shown in FIG. 2. In more concrete, the steps S11 to S19 and S41 are executed similarly to those designated by like reference characters in FIG. 2.

Besides, the other routines and operations not shown in FIG. 4 are essentially same as those described hereinbefore by reference to FIGS. 8, 9, 10, 12 and 13. Thus, it will be unnecessary to describe repeatedly the same operations as those mentioned previously.

At first, when the serial command signal C is inputted after the rewrite signal A issued by the memory rewriting device 50 (see FIG. 8) is changed over to the on-state and the processing of the bootstrap program 13 (see FIG. 10) being started, as mentioned previously in conjunction with the first embodiment of the invention. Then, the interrupt processing routine shown in FIG. 4 is activated in response to the command signal C.

When it is decided in the step S41 shown in FIG. 4 that the command signal C is the control variable initialize command (i.e., when the decision step S41 results in affirmation "YES"), the decision reference value of the control program stored in the writable non-volatile ROM 12 is set to an abnormal value (step S52), and the interrupt processing routine waiting state is restored.

Subsequently, when the data load processing for writing data into the control program (see FIG. 12) and the processing operation of the bootstrap program 13 has been completed, the processing routine of the control program is started (FIG. 13). 0067]

When it is decided in the step S32 shown in FIG. 13 that the decision reference value in the writable non-volatile ROM 12 does not coincide with the predetermined value in the backup RAM 14, indicating that abnormality occurs in the backup data (i.e., when the decision step S32 results in affirmation "YES"), the initialization processing for the backup RAM 14 (step S35) and the reset processing for the backup-power-supply-off decision circuit 17 (step S36) are executed, as described previously.

In this manner, by setting the decision reference value on the control program to an abnormal value by the bootstrap program 13 upon rewriting of the control program stored in the writable non-volatile ROM 12, the control program can find discrepancy (indicating abnormality) between the decision reference value on the control program and the predetermined value in the backup RAM 14 without fail, to thereby initialize automatically the control variables stored in the backup RAM 14 so that they can conform with the control program rewritten in accordance with the updated specifications.

Further, because the data for initialization for the backup RAM 14 can previously be prepared as the data to be written in the writable non-volatile ROM 12, it is unnecessary to modify the memory rewriting device 50 and the bootstrap program 13. Besides, not only the control variable initialize command of the ordinary control program but also the initialization flag FN as well as processing thereof is rendered unnecessary.

Embodiment 3

In the vehicle-onboard control system according to the first and second embodiments of the invention described above, the information for initializing the control variables is set upon rewriting of the control program, wherein the backup RAM 14 is initialized when the control program is activated after having been rewritten. However, such arrangement may equally be adopted that the backup RAM 14 is initialized on a real time basis upon execution of the processing for rewriting the control program.

Figure 5:
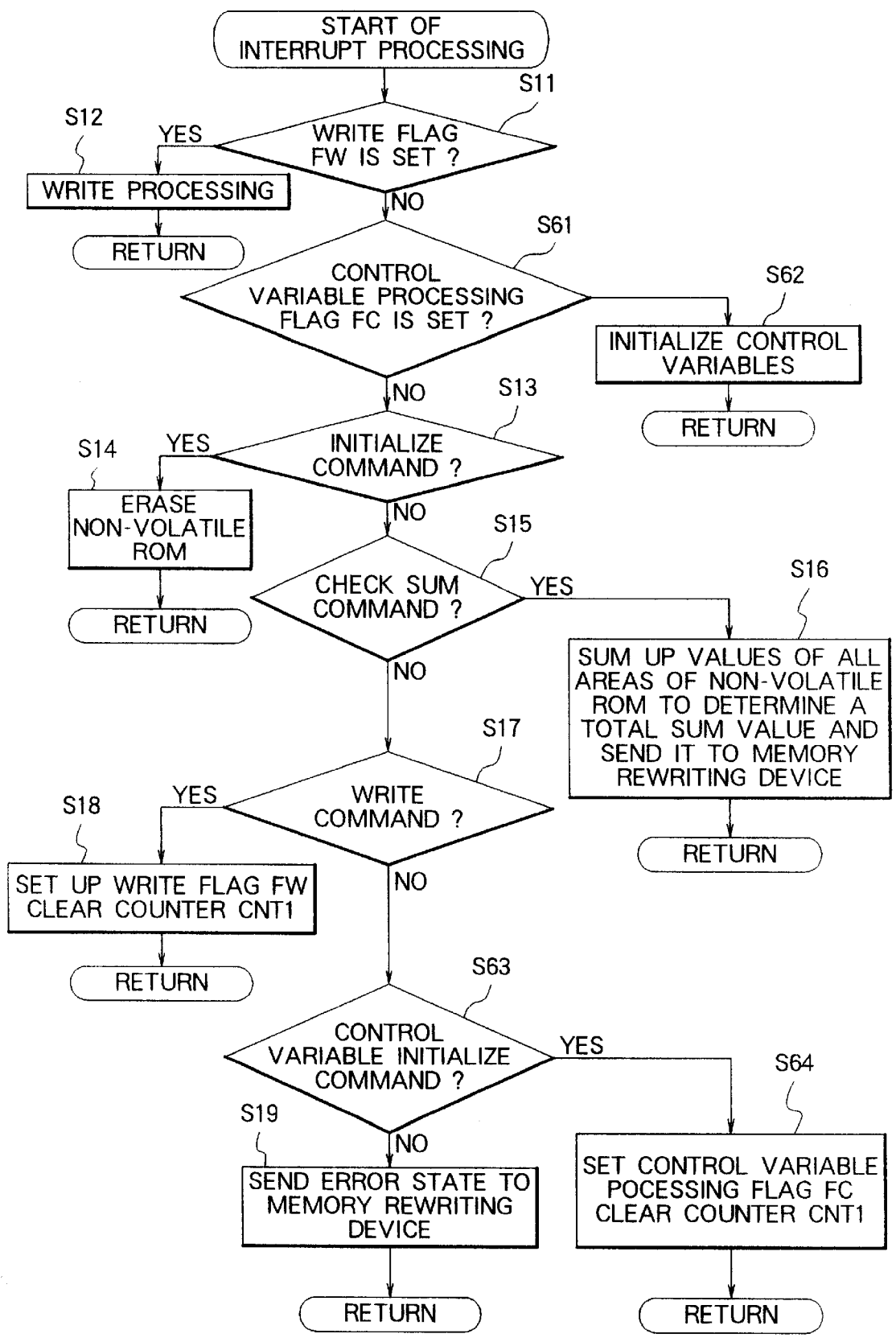
FIG. 5 is a flow chart for illustrating an interrupt processing operation in an onboard-control system according to a third embodiment of the present invention.
Figure 6:
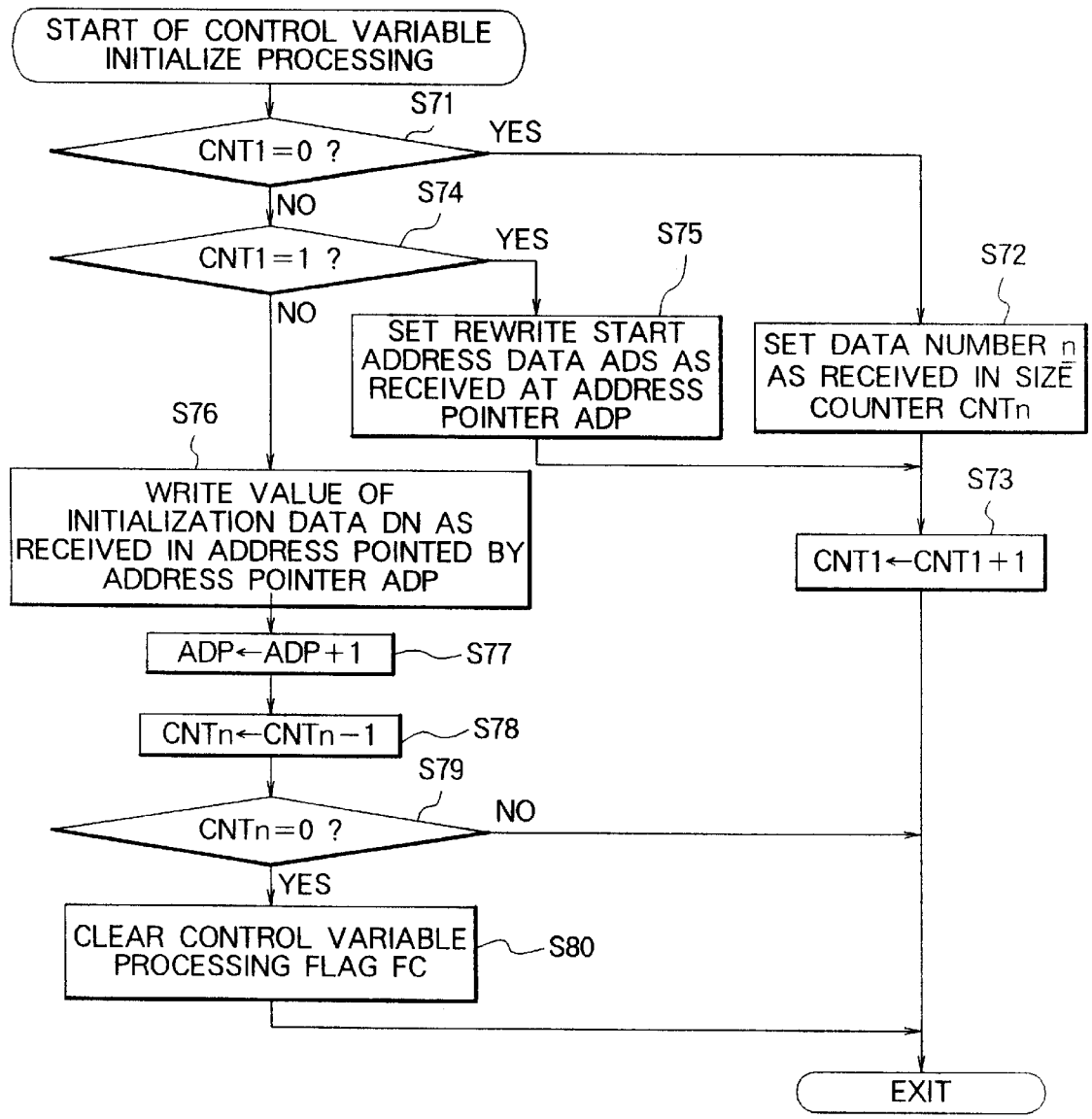
FIG. 6 is a flow chart for illustrating control variable initialization processing in the vehicle-onboard control system according to the third embodiment of the invention.
Figure 7:
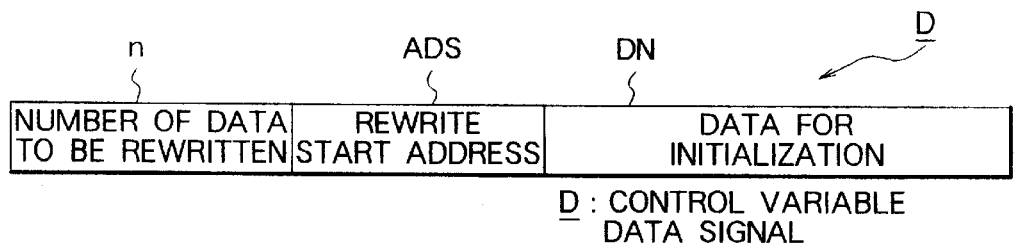
FIG. 7 is a view showing a format of a signal employed for an initialization in the control system according to the third embodiment of the invention.

Now, referring to flow charts shown in FIGS. 5 and 6 together with FIG. 7 which is a view for illustrating an initialization data format, description will turn to operation of the vehicle-onboard control system according to a third embodiment of the invention.

Parenthetically, FIG. 5 is a flow chart illustrating an interrupt processing routine which corresponds to those described previously by reference to FIGS. 2, 4 and 11. Except for addition of steps S61 to S64, the routine shown in FIG. 5 is substantially same as that shown in FIG. 11. In more concrete, the steps S11 to S19 are executed similarly to those designated by like reference characters in FIG. 11.

Besides, the remaining routines and operations not shown in FIG. 5 are essentially same as those described hereinbefore by reference to FIGS. 8, 9, 10, 12 and 13. Accordingly, repetitive description of the same operations as those mentioned previously will be unnecessary.

FIG. 6 is a flow chart for illustrating a control variable initialization processing routine included in the processing shown in FIG. 5, and FIG. 7 is a view for illustrating a format of a control variable data signal outputted from the memory rewriting device 50 (see FIG. 8).

As can be seen in FIG. 7, the control variable data signal D contains a number n of data to be rewritten, a rewrite start address ADS and initialization data (i.e., data for initialization) DN.

In the vehicle-onboard control system according to the instant embodiment of the invention, the microcomputer 10 (see FIG. 8) is equipped with a register (not shown) for storing a control variable processing flag FC, wherein the control variable processing flag FC is adapted to be set up in response to the command signal C (i.e., control variable initialize command) upon rewriting of the control program.

Further, the memory rewriting device 50 is so designed as to output not only the command signal C containing a control variable initialize command but also the control variable data signal D.

Moreover, the bootstrap program 13 responds to the set state of the control variable processing flag FC upon rewriting of the control program to thereby initialize the control variables stored in the backup RAM 14 at predetermined locations determined by the number n of data to be rewritten and the rewrite start address ADS in accordance with the initialization data DN.

When the rewrite processing shown in FIG. 12 is completed and when decision is made in the step S11 shown in FIG. 5 that the write flag FW has been cleared (i.e., when the step S11 results in "NO"), it is then decided in a step S61 whether the control variable processing flag FC is in the set state or not.

When decision is made that the control variable processing flag FC is set (i.e., when the step S61 results in "YES"), the control variable initialization processing is executed (step S62), whereupon the interrupt processing routine waiting state is regained.

On the contrary, when it is decided in the step S61 that the control variable processing flag FC has been cleared (i.e., when the step S61 results in "NO"), the command check steps S13, S15 and S17 mentioned hereinbefore are executed. In that case, when the step S17 results in negation or "NO", then it is checked in a step S63 whether the command signal of concern is the control variable initialize command or not.

When it is decided that the command signal C is the control variable initialize command (i.e., when the decision step S63 results in "YES"), the control variable processing flag FC is set with the counter CNT1 being cleared (step S64), whereupon the interrupt processing routine waiting state is regained.

On the other hand, unless the command signal C represents the control variable initialize command (i.e., when the decision step S63 results in "NO"), then the error send step S19 is executed.

When the control variable processing flag FC is set up in the step S64, the decision step S61 results in affirmation or "YES" upon execution of the succeeding interrupt processing routine. Consequently, the processing proceeds to the control variable initialization step S62, whereby the processing routine illustrated in FIG. 6 is executed.

Referring to FIG. 6, in a step S71, decision is made whether the value of the counter CNT1 is zero "0" or not. When the counter value CNT1 is equal to zero (i.e., when the step S71 results in "YES"), the data as received (i.e., the number n of data carried by the control variable data signal D) is placed in a size counter CNTn in a step S72, while the counter CNT1 is incremented by one "1" (step S73), whereupon the processing leaves the routine shown in FIG. 6.

Because the counter CNT1 is cleared in the step S64 (FIG. 5) in the initial state, the processing proceeds to a step S72.

On the contrary, when decision is made in the step S71 that the value of the counter CNT1 is greater than zero (i.e., when the step S71 results in "NO"), it is then decided in a step S74 whether the content of the counter CNT1 is equal to "1" or not. When the counter value CNT1 is equal to "1" (i.e., when the step S74 results in "YES"), the received data (i.e., the rewrite start address ADS contained in the control variable data signal D) is set at an address pointer ADP in a step S75, whereon the step S73 for incrementing the counter CNT1 is executed.

On the other hand, when decision is made in the step S74 that the counter value CNT1 is greater than "1" (i.e., when the step S74 results in "NO"), the values of the received data (i.e., the initialization data DN) are written in the address pointed by the address pointer ADP in a step S76. In succession, the address pointer ADP is incremented by one in a step S77.

Additionally, the size counter CNTn is decremented in a step S78, and decision is made in a step S79 whether or not the value of the size counter CNTn has reached zero.

When the counter value CNTn is greater than zero (i.e., the answer of the decision step S79 is "NO"), the processing leaves the routine now under consideration, while when the counter value CNTn is equal to zero (i.e., when the answer of the step S79 is "YES"), the control variable processing flag FC is cleared in a step S80, whereupon the processing leaves the current routine.

In this manner, by supplying the number n of data to be written in the backup RAM 14 for initialization thereof, the rewrite start address ADS and the initialization data DN from the memory rewriting device 50 upon every rewriting of the control program stored in the writable non-volatile ROM 12, it is possible to initialize the backup RAM 14 on the real time basis by using the bootstrap program 13.

Thus, with the arrangement of the vehicle-onboard control system according to the third embodiment of the invention, only a minimum number of control variables for alteration of the control program can be initialized while the control variables which are not required to be changed can be left as they are. Thus, the control performance of the vehicle-onboard control system can further be enhanced after rewriting of the control program.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although the invention has been described in conjunction with the power train of a motor vehicle, it can readily be appreciated that the control system according to the invention can find application to other controls such as brake control, suspension control and so forth of the motor vehicle. Furthermore, it is contemplated that storage or recording media on which the teachings of the invention are recorded in the form of programs executable by computers inclusive of microprocessor are to be covered by the invention.

Accordingly, all suitable modifications and equivalents may be resorted to, falling within the spirit and scope of the invention.

What is claimed is:

1. A vehicle-onboard control system installed on a motor vehicle for controlling at least one device mounted on said vehicle, comprising:

a central processing unit (11) for executing a control program by using various control variables to thereby control said device (40) mounted on said motor vehicle;

a writable non-volatile read-only memory (12) for storing said control program;

a backup random access memory (14) for storing said control variables;

a backup power supply (30) for supplying electric power to said backup random access memory (14);

a bootstrap program (13) for operating said central processing unit (11) to allow said control program to be rewritten;

an address changing interface (15) for locating said bootstrap program (13) at an address executable by said central processing unit (11) upon rewriting of said control program; and a memory rewriting device (50) for outputting a rewrite signal (A) for actuating said address changing interface (15) and a command signal (C) for activating said bootstrap program (13);

wherein an initialization flag (FN) is provided in said backup random access memory 14) adapted to be set by said bootstrap program (13) in response to said command signal (C) upon rewriting of the said control program; and wherein said control program responds to the set state of said initialization flag (FN) upon activation of said control program after having been rewritten, to thereby initialize said control variables stored in said backup random access memory (14).

2. A vehicle-onboard control system according to claim 1, wherein processes for rewriting said control program stored in said writable non-volatile read-only memory (12) and initialization of said backup random access memory (14) are executed as interrupt processing routines enabled by said bootstrap program (13).

3. A vehicle-onboard control system according to claim 2, wherein said command signal (C) contains a control variable initialize command signal; and wherein said backup random access memory (14) is initialized in response to said control variable initialize command with said initialization flag (FN) being set up in said backup random access memory (14).

4. A vehicle-onboard control system according to claim 1, wherein initialization of said control variables stored in said backup random access memory (14) is executed by said control program upon activation thereof after having been rewritten when an off-state of said backup power supply (30) is detected.

5. A vehicle-onboard control system according to claim 1, wherein initialization of said control variables stored in said backup random access memory (14) is executed by said control program upon activation thereof after having been rewritten when data stored in said backup random access memory (14) is decided as being abnormal.

6. A vehicle-onboard control system installed on a motor vehicle for controlling at least one device mounted on said vehicle, comprising:

a central processing unit (11) for executing a control program by using various control variables to thereby control said device (40) mounted on said motor vehicle;

a writable non-volatile read-only memory (12) for storing said control program;

a backup random access memory (14) for storing said control variables;

a backup power supply (30) for supplying electric power to said backup random access memory (14);

a bootstrap program (13) for operating said central processing unit (11) to rewrite said control program;

an address changing interface (15) for locating said bootstrap program (13) at an address executable by said central processing unit (11) upon rewriting of said control program; and a memory rewriting device (50) for outputting a rewrite signal (A) for actuating said address changing means interface (15) and a command signal (C) for activating said bootstrap program (13);

wherein said control program, after have been rewritten, compares a decision reference value stored in said writable non-volatile read-only memory (12) with a predetermined value stored in said backup random access memory (14) to thereby initialize said backup random access memory (14) when discrepancy is detected between said decision reference value and said predetermined value;

said bootstrap program responding to said command signal (C) to thereby update said decision reference value to an abnormal value; and wherein said control program initializes said backup random access memory (14) in response to a discrepancy between said abnormal value and said predetermined value upon activation of said control program after having been rewritten.

7. A vehicle-onboard control system according to claim 6, wherein processes for rewriting said control program stored in said writable non-volatile read-only memory (12) and initialization of said backup random access memory (14) are executed as interrupt processing routines enabled by said bootstrap program (13).

8. A vehicle-onboard control system according to claim 7, wherein said command signal (C) contains a control variable initialize command signal; and wherein said bootstrap program responds to said control variable initialize command to thereby change said decision reference value to said abnormal value.

9. A vehicle-onboard control system installed on a motor vehicle for controlling at least one device mounted on said vehicle, comprising:

a central processing unit (11) for executing a control program by using various control variables to control said device (40) mounted on said motor vehicle;

a writable non-volatile read-only memory (12) for storing said control program;

a backup random access memory (14) for storing said control variables;

a backup power supply (30) for supplying electric power to said backup random access memory (14);

a bootstrap program (13) for operating said central processing unit (11) to rewrite said control program;

an address changing interface (15) for locating said bootstrap program (13) at an address executable by said central processing unit (11) upon rewriting of said control program; and a memory rewriting device (50) for outputting a rewrite signal (A) for actuating said address changing (15) and a command signal (C) for activating said bootstrap program (13);

wherein a control variable processing flag (FC) adapted to be set in response to said command signal (C) upon rewriting of said control program is provided;

said memory rewriting device (50) outputting a control variable data signal (D) together with said command signal (C);

said command signal (C) containing a control variable initialize command;

said control variable data signal (D) containing a number (n) of data for rewriting said control variable, a start address (ADS) for the rewriting and data for initialization (DN);

said control variable processing flag (FC) being set up in response to said control variable initialize command;

wherein upon rewriting of said control program, said bootstrap program (13) responds to the set state of said control variable processing flag (FC) to thereby initialize in accordance with said data (DN) for initialization the control variables stored at memory locations of said backup random access memory (14) which are determined by said number (n) of the data for rewriting and said rewrite start address (ADS).

10. A method for rewriting a control program stored in a writable non-volatile read-only memory (12) provided in a vehicle-onboard control system installed on a motor vehicle for controlling at least one device mounted on said vehicle, which system further includes a central processing unit (11) for executing the control program by using control variables to thereby control said device (40) mounted on said motor vehicle, a backup random access memory (14) for storing said control variables, a bootstrap program (13) for operating said central processing unit (11) to allow interrupt processing routines to be executed thereby, and a switching device (15) for changing over said bootstrap program and said control program with one another for execution by said central processing unit, the method for rewriting said control program stored in said writable non-volatile read-only memory (12), comprising the steps of:
issuing a command signal (A, C, D) for activating said bootstrap program to rewrite said control program; and
providing information for allowing an altered control program resulting from said rewriting to initialize said control variables so that said control variables conform with said altered control program.

11. The method according to claim 10,
wherein said information represents an initialization flag (FN) set up in said backup random access memory (14) by said bootstrap program, and
further comprising the step in which said altered control program checks said initialization flag (FN) upon activation to thereby initialize said control variables stored in said backup random access memory (14) when said initialization flag (FN) is set up.

12. The method according to claim 10,
wherein said information represents an abnormal value of a given one of said control variables stored in said backup random access memory (14), said abnormal value being set in said altered control program, and
further comprising the step in which said altered control program compares upon activation thereof said abnormal value and said given one value to thereby initialize said control variables stored in said backup random access memory (14) when said comparison results in discrepancy.

13. The method according to claim 10,
wherein said information represents a control variable initialize command contained in said command signal (C); and
further comprising the steps of:
issuing a control variable data signal (D) together with said command signal (C); and
setting a control variable processing flag (FC) in response to said control variable initialize command;
wherein upon rewriting of said control program, said bootstrap program (13) responds to the set state of said control variable processing flag (FC) to thereby initialize the control variables stored at memory locations of said backup random access memory (14) in accordance with said control variable data signal (D).

* * * * *